US008656447B2

(12) United States Patent
Pasternak et al.

(10) Patent No.: US 8,656,447 B2
(45) Date of Patent: Feb. 18, 2014

(54) SPLICING OF CONTENT

(75) Inventors: Tal Pasternak, Jerusalem (IL); Keith Millar, W. Sussex (GB); Len Sundy, Ramat Beit Shemesh (IL); Avraham Poupko, Jerusalem (IL)

(73) Assignee: Cisco Technology Inc., San Jose, CA (US)

( * ) Notice: Subject to any disclaimer, the term of this patent is extended or adjusted under 35 U.S.C. 154(b) by 0 days.

(21) Appl. No.: 13/515,372

(22) PCT Filed: Oct. 24, 2010

(86) PCT No.: PCT/IB2010/054808
§ 371 (c)(1),
(2), (4) Date: Jun. 25, 2012

(87) PCT Pub. No.: WO2011/158071
PCT Pub. Date: Dec. 22, 2011

(65) Prior Publication Data
US 2012/0272286 A1 Oct. 25, 2012

(30) Foreign Application Priority Data

Jun. 15, 2010 (GB) .................................. 1009948.9

(51) Int. Cl.
*H04N 7/16* (2011.01)
(52) U.S. Cl.
USPC ........... 725/146; 725/143; 725/144; 725/145; 725/147; 725/148; 725/149; 348/14.04; 348/14.12; 386/213; 386/214; 455/3.02; 455/414.1
(58) Field of Classification Search
None
See application file for complete search history.

(56) References Cited

U.S. PATENT DOCUMENTS

| 6,049,569 A | 4/2000 | Radha et al. |
| 6,678,332 B1 | 1/2004 | Gardere et al. |
| 6,744,789 B1 | 6/2004 | Michener |

(Continued)

FOREIGN PATENT DOCUMENTS

| EP | 1 447 983 A1 | 8/2004 |
| EP | 1 936 970 A2 | 6/2008 |

(Continued)

OTHER PUBLICATIONS

"Series J: Cable Networks and Transmission of Television, Sound Programme and Other Multimedia Signals; Interactive Systems for Digital Television Distribution; Client Digital Program Insertion API" (Recommendation ITU-T J.215, Dec. 2007).

(Continued)

*Primary Examiner* — Nasser Goodarzi
*Assistant Examiner* — Paul Graham
(74) *Attorney, Agent, or Firm* — Husch Blackwell LLP

(57) ABSTRACT

A Headend system including a video codec to encode a video sequence yielding an encoded video sequence having video packets, a multiplexer, a signal generator to receive a notification of a splice point, analyze at least some of the encoded video packets based on the notification in order to find a random-access-point-packet, the random-access-point being a point from which to start decoding the encoded video sequence by the rendering device so that the video sequence may be rendered for output from the splice point, create a timing signal estimating a location of the random-access-point-packet in the encoded video sequence, and output the timing signal to the multiplexer or transmission equipment. Related apparatus and methods are also described.

7 Claims, 13 Drawing Sheets

(56) References Cited

U.S. PATENT DOCUMENTS

| | | | |
|---|---|---|---|
| 6,791,995 B1* | 9/2004 | Azenkot et al. | 370/436 |
| 6,792,047 B1 | 9/2004 | Bixby et al. | |
| 6,806,909 B1 | 10/2004 | Radha et al. | |
| 7,096,481 B1 | 8/2006 | Forecast et al. | |
| 7,106,749 B1 | 9/2006 | Darshan et al. | |
| 7,139,283 B2* | 11/2006 | Quigley et al. | 370/432 |
| 7,231,212 B2* | 6/2007 | Arazi et al. | 455/436 |
| 7,302,001 B2* | 11/2007 | Wang et al. | 375/240.1 |
| 7,477,692 B2 | 1/2009 | Schwartz et al. | |
| 7,634,785 B2 | 12/2009 | Smith | |
| 7,933,295 B2* | 4/2011 | Thi et al. | 370/493 |
| 8,270,488 B2* | 9/2012 | Connery et al. | 375/240.13 |
| 2004/0001592 A1 | 1/2004 | Akiwumi-Assani et al. | |
| 2004/0255328 A1* | 12/2004 | Baldwin et al. | 725/90 |
| 2005/0105886 A1* | 5/2005 | Abelard et al. | 386/94 |
| 2005/0281328 A1* | 12/2005 | Hurst et al. | 375/240 |
| 2006/0093045 A1 | 5/2006 | Anderson et al. | |
| 2008/0155581 A1* | 6/2008 | Leary | 725/13 |
| 2008/0235722 A1 | 9/2008 | Baugher et al. | |
| 2009/0202225 A1* | 8/2009 | Rodriguez et al. | 386/95 |
| 2010/0014594 A1* | 1/2010 | Beheydt et al. | 375/240.26 |
| 2011/0064094 A1* | 3/2011 | Furusawa et al. | 370/474 |

FOREIGN PATENT DOCUMENTS

| | | |
|---|---|---|
| WO | WO 01/35669 A1 | 5/2001 |
| WO | WO 03/010970 A2 | 2/2003 |
| WO | WO 2006/078246 A1 | 7/2006 |
| WO | WO 2008/023236 A2 | 2/2008 |

OTHER PUBLICATIONS

Feb. 18, 2011 PCT Invitation to Pay Additional Fees for PCT/IB2010/054808.

Apr. 4, 2011 Transmittal of ISR and Written Opinion of International Searching Authority for PCT/IB2010/054808.

"Digital Video Broadcasting (DVB); Specification for the Carriage of Synchronized Auxiliary Data in DVB Transport Streams" (ETSI TS 102 823 V1.1.1)(European Telecommunications Standard Institute, Nov. 2005).

"Proposed SMPTE Standard for Television; Splice Points for MPEG-2 Transport Streams" (SMPTE 312M) (SMPTE Journal, Oct. 1998, pp. 916-925).

"Series J: Cable Networks and Transmission of Television, Sound Programme and Other Multimedia Signals; Interactive Systems for Digital Television Distribution; Client Digital Program Insertion API" (Recommendation ITU-T J.125, Dec. 2007).

"Series J: Cable Networks and Transmission of Television, Sound Programme and Other Multimedia Signals; Digital Transmission of Television Signals; Digital Program Insertion Cueing Message for Cable Television Systems" (Recommendation ITU-T J.181, Jun. 2004).

"Stream Conditioning for Switching of Addressable Content in Digital Television Receivers" (ANSI/SCTE 138 2009) (Society of Cable Telecommunications Engineers 2009).

* cited by examiner

SPLICING OF CONTENT

RELATED APPLICATION INFORMATION

The present application is a 35 USC §371 application of PCT/IB2010/054808, filed on 24 Oct. 2010 and entitled "Splicing of Content", which was published on 22 Dec. 2011 in the English language with International Publication Number WO 2011/158071, and which relies for priority on UK Patent Application 1009948.9, filed 15 Jun. 2010.

FIELD OF THE INVENTION

The present invention relates to splicing of content.

BACKGROUND OF THE INVENTION

The following references are believed to represent the state of the art:

U.S. Published Patent Application 2004/001592 of Akiwumi-Assani, et al.;
U.S. Published Patent Application 2008/235722 of Baugher, et al.;
U.S. Pat. No. 7,096,481 to Forecast, et al.;
U.S. Pat. No. 7,106,749 to Darshan, et al.;
U.S. Pat. No. 7,634,785 to Smith;
PCT Published Patent Application WO 01/35669 of NDS Limited; and
PCT Published Patent Application WO 03/010970 of NDS Limited.

SUMMARY OF THE INVENTION

The present invention, in certain embodiments thereof, seeks to provide an improved system for splicing of content.

There is thus provided in accordance with an embodiment of the present invention, a Headend system including a plurality of operationally connected modules including a video codec to encode a video sequence yielding an encoded video sequence having a plurality of video packets, a multiplexer to receive the video packets of the encoded video sequence and prepare a transport stream including the video packets, and a signal generator to receive a notification of a splice point, the splice point being a point from which to start rendering the video sequence by a rendering device for output to an output device, analyze at least some of the encoded video packets based on the notification of the splice point in order to find a random-access-point-packet of the packets, the random-access-point being a point from which to start decoding the encoded video sequence by the rendering device so that the video sequence may be rendered for output from the splice point, create a timing signal estimating a location of the random-access-point-packet in the encoded video sequence, and output the timing signal to the multiplexer or a transmission equipment.

Further in accordance with an embodiment of the present invention, the signal generator is operative to receive the notification of the splice point in the video sequence based on a presentation time-stamp of the splice point or an SMPTE 312 timecode of the splice point.

Still further in accordance with an embodiment of the present invention, the multiplexer is operative to multiplex the video packets of the encoded video sequence with other video packets of at least one other video sequence.

Additionally in accordance with an embodiment of the present invention, the signal generator has an input and an output, the encoder having an output, the multiplexer having an input, the input of the signal generator being operationally connected to the output of the encoder, the output of the signal generator being operationally connected to the input of the multiplexer.

Moreover in accordance with an embodiment of the present invention, the signal generator is operative to update/create a data packet having a private descriptor and a timestamp such that the private descriptor includes a value X equal to the difference between the timestamp of the data packet and the timing signal, and output the data packet including the value X to the multiplexer or a transmission equipment.

There is also provided in accordance with still another embodiment of the present invention, a end user rendering system including a receive module to receive a media stream from a Headend, the media stream including an encoded video sequence having a plurality of video packets, the video packets including a plurality of random-access-point-packets representing random-access-points in the encoded video sequence, and a plurality of time-stamps assigned at the Headend, and a timing signal from the Headend, the timing signal estimating a location in the encoded video sequence of one of the random-access-point-packets, the one random-access-point being a point from which to start decoding the encoded video sequence so that the video sequence may be rendered for output to an output device from the splice point, a packet-number assignor to sequentially assign a plurality of packet-numbers to the received video packets of the encoded video sequence so that each one of the video packets is assigned one of the packet numbers, a clock to provide a clock reading, the clock reading being at least partially driven by at least some of the time-stamps, a mapping table module to maintain a mapping table which maps at least some of the packet-numbers to a plurality of timing values such that one of the timing values mapped to one of the at least some packet-numbers is assigned a certain time of the one packet having the one at least some packet number, the certain time being based on one of the time-stamps or the clock reading, a packet-number finder to determine a possible packet-number of the one random-access-point-packet based on the timing signal estimating the location of the one random-access-point-packet, and at least part of the mapping table, a storage unit to store therein the encoded video sequence, and an index file including the possible packet-number for later use, and a rendering module to retrieve the possible packet-number from the index file, and access the encoded video sequence starting at the possible packet-number.

Further in accordance with an embodiment of the present invention, the timing values of the mapping table include a first timing value and a second timing value, the packet-numbers of the mapping table include a first packet-number and a second packet-number, the first timing value and the second timing value map to the first packet-number and the second packet-number, respectively, and the packet-number finder is operative to determine the possible packet-number of the one random-access-point-packet by a determination including interpolating between, or extrapolating from, the first packet number and the second packet number based on the timing signal, the first timing value and the second timing value.

Still further in accordance with an embodiment of the present invention, each of the random-access-point-packets is identified by a random-access-indicator, the mapping table module is operative to maintain the mapping table to include the packet-numbers of the random-access-point-packets, and indicate that the random-access-point packets are random-access-points, and the packet-number finder is operative to determine the possible packet-number of the one randomaccess-point-packet by a determination including interpolating between, or extrapolating from, the first packet number and the second packet number based on the timing signal, the first timing value and the second timing value thereby yielding a third packet number, and finding, in the mapping table, one of the random-access-point-packet packet-numbers closest to the third packet number yielding the possible packet-number.

Additionally in accordance with an embodiment of the present invention, each of the random-access-point-packets is identified by a random-access-indicator, the mapping table module is operative to maintain the mapping table to map the packet-numbers of the random-access-point-packets to at least some of the timing values the certain time of the random-access-point-packets, and indicate in the mapping table that the random-access-point packets are random-access-points, and the packet-number finder is operative to find, in the mapping table, one of the random-access-point-packet timing values which is closest to the timing signal in order to find the possible packet-number.

Moreover in accordance with an embodiment of the present invention, the time stamps are included in the video packets of the encoded video sequence, and the mapping table module is operative to maintain the mapping table to map at least some of the time stamps of the video packets to the at least some packet-numbers.

Further in accordance with an embodiment of the present invention, the receive module is operative to receive the encoded video sequence at least partially cryptographically encrypted, and the storage unit is operative to store therein the encoded video sequence at least partially cryptographically encrypted.

Still further in accordance with an embodiment of the present invention, the rendering module is operative to decode the encoded video sequence from the possible packet number, and render the video sequence for output to the output device from the splice point.

Additionally in accordance with an embodiment of the present invention, the certain time is an arrival time of the one packet having the one at least some packet number.

There is also provided in accordance with still another embodiment of the present invention, a end user rendering system including a receive module to receive a media stream from a Headend, the media stream including an encoded video sequence having a plurality of video packets, and a plurality of time-stamps assigned at the Headend, and a timing signal from the Headend, the timing signal estimating a location in the encoded video sequence of a random-access-point-packet of the video packets, the random-access-point being a point from which to start decoding the encoded video sequence so that the video sequence may be rendered for output to an output device from the splice point, a packet-number assignor to sequentially assign a plurality of packet-numbers to the received video packets of the encoded video sequence so that each one of the video packets is assigned one of the packet numbers, a clock to provide a clock reading, the clock reading being at least partially driven by at least some of the time-stamps, a mapping table module to maintain a mapping table which maps at least some of the packet-numbers to a plurality of timing values such that one of the timing values mapped to one of the at least some packet-numbers is assigned a certain time of the one packet having the one at least some packet number, the certain time being based on one of the time-stamps or the clock reading, the timing values of the mapping table including a first timing value and a second timing value, the packet-numbers of the mapping table including a first packet-number and a second packet-number, the first timing value and the second timing value mapping to the first packet-number and the second packet-number, respectively, a packet-number finder to determine a possible packet-number of the random-access-point-packet by interpolating between, or extrapolating from, the first packet number and the second packet number based on the timing signal, the first timing value and the second timing value, and a rendering module to access the encoded video sequence starting at the possible packet-number.

There is also provided in accordance with still another embodiment of the present invention, a method including encoding a video sequence using a video codec yielding an encoded video sequence having a plurality of video packets, receiving a notification of a splice point, the splice point being a point from which to start rendering the video sequence by a rendering device for output to an output device, analyzing at least some of the encoded video packets based on the notification of the splice point in order to find a random-access-point-packet of the packets, the random-access-point being a point from which to start decoding the encoded video sequence by the rendering device so that the video sequence may be rendered for output from the splice point, and creating a timing signal estimating a location of the random-access-point-packet in the encoded video sequence.

There is also provided in accordance with still another embodiment of the present invention, a method including receiving a media stream from a Headend, the media stream including an encoded video sequence having a plurality of video packets, and a plurality of time-stamps assigned at the Headend, receiving a timing signal from the Headend, the timing signal estimating a location in the encoded video sequence of a random-access-point-packet of the video packets, the random-access-point being a point from which to start decoding the encoded video sequence so that the video sequence may be rendered for output to an output device from the splice point, sequentially assigning a plurality of packet-numbers to the received video packets of the encoded video sequence so that each one of the video packets is assigned one of the packet numbers, providing a clock reading, the clock reading being at least partially driven by at least some of the time-stamps, maintaining a mapping table which maps at least some of the packet-numbers to a plurality of timing values such that one of the timing values mapped to one of the at least some packet-numbers is assigned a certain time of the one packet having the one at least some packet number, the certain time being based on one of the time-stamps or the clock reading, determining a possible packet-number of the random-access-point-packet based on the timing signal estimating the location of the random-access-point-packet, and at least part of the mapping table, storing the encoded video sequence, storing the possible packet number in an index file for later use, retrieving the possible packet-number from the index file, and accessing the encoded video sequence starting at the possible packet-number.

There is also provided in accordance with still another embodiment of the present invention, a method including receiving a media stream from a Headend, the media stream including an encoded video sequence having a plurality of video packets, and a plurality of time-stamps assigned at the Headend, receiving a timing signal from the Headend, the timing signal estimating a location in the encoded video sequence of a random-access-point-packet of the video packets, the random-access-point being a point from which to start decoding the encoded video sequence so that the video sequence may be rendered for output to an output device from the splice point, sequentially assigning a plurality of packet-numbers to the received video packets of the encoded video sequence so that each one of the video packets is assigned one of the packet numbers, providing a clock reading, the clock reading being at least partially driven by at least some of the time-stamps, maintaining a mapping table which maps at least some of the packet-numbers to a plurality of timing values such that one of the timing values mapped to one of the at least some packet-numbers is assigned a certain time of the one packet having the one at least some packet number, the certain time being based on one of the time-stamps or the clock reading, the timing values of the mapping table including a first timing value and a second timing value, the packet-numbers of the mapping table including a first packet-number and a second packet-number, the first timing value and the second timing value mapping to the first packet-number and the second packet-number, respectively, determining a possible packet-number of the random-access-point-packet by interpolating between, or extrapolating from, the first packet number and the second packet number based on the timing signal, the first timing value and the second timing value, and accessing the encoded video sequence starting at the possible packet-number.

BRIEF DESCRIPTION OF THE DRAWINGS

The present invention will be understood and appreciated more fully from the following detailed description, taken in conjunction with the drawings in which.

DETAILED DESCRIPTION OF AN EMBODIMENT

Figure 1:
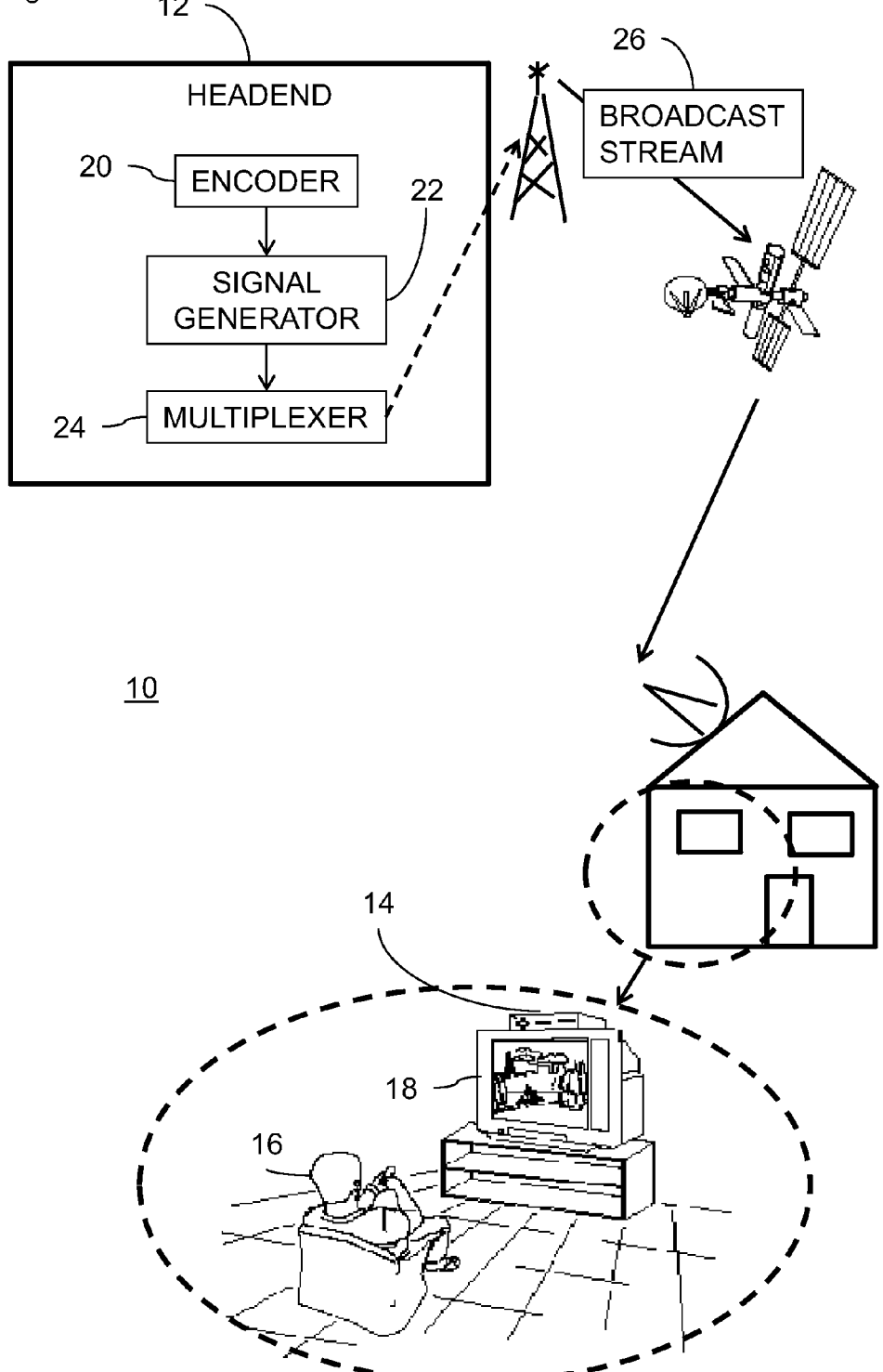
FIG. 1 is a partly pictorial, partly block diagram view of a content splicing system constructed and operative in accordance with an embodiment of the present invention.

The term "encoded" is used throughout the present specification and claims, in all of its grammatical forms, to refer to any type of data stream encoding including, for example and without limiting the scope of the definition, well known types of encoding such as, but not limited to, MPEG-2 encoding, H.264 encoding, VC-1 encoding, and synthetic encodings such as Scalable Vector Graphics (SVG) and LASER (ISO/IEC 14496-20), and so forth. It is appreciated that an encoded data stream generally requires more processing and typically more time to read than a data stream which is not encoded. Any recipient of encoded data, whether or not the recipient of the encoded data is the intended recipient, is, at least in potential, able to read encoded data without requiring cryptanalysis. It is appreciated that encoding may be performed in several stages and may include a number of different processes, including, but not necessarily limited to: compressing the data; transforming the data into other forms; and making the data more robust (for instance replicating the data or using error correction mechanisms).

The term "compressed" is used throughout the present specification and claims, in all of its grammatical forms, to refer to any type of data stream compression. Compression is typically a part of encoding and may include image compression and motion compensation. Typically, compression of data reduces the number of bits comprising the data. In that compression is a subset of encoding, the terms "encoded" and "compressed", in all of their grammatical forms, are often used interchangeably throughout the present specification and claims.

Similarly, the terms "decoded" and "decompressed" are used throughout the present specification and claims, in all their grammatical forms, to refer to the reverse of "encoded" and "compressed" in all their grammatical forms.

The terms "scrambled" and "encrypted", in all of their grammatical forms, are used interchangeably throughout the present specification and claims to refer to any appropriate scrambling and/or encryption methods for scrambling and/or encrypting a data stream, and/or any other appropriate method for intending to make a data stream unintelligible except to an intended recipient(s) thereof. Well known types of scrambling or encrypting include, but are not limited to DES, 3DES, and AES. Similarly, the terms "descrambled" and "decrypted" are used throughout the present specification and claims, in all their grammatical forms, to refer to the reverse of "scrambled" and "encrypted" in all their grammatical forms.

Pursuant to the above definitions, the terms "encoded"; "compressed"; and the terms "scrambled" and "encrypted" are used to refer to different and exclusive types of processing. Thus, a particular data stream may be, for example: encoded, but neither scrambled nor encrypted; compressed, but neither scrambled nor encrypted; scrambled or encrypted, but not encoded; scrambled or encrypted, but not compressed; encoded, and scrambled or encrypted; or compressed, and scrambled or encrypted.

Likewise, the terms "decoded" and "decompressed" one the one hand, and the terms "descrambled" and "decrypted" on the other hand, are used to refer to different and exclusive types of processing.

Reference is now made to FIG. 1, which is a partly pictorial, partly block diagram view of a content splicing system 10 constructed and operative in accordance with an embodiment of the present invention.

The content splicing system 10 includes a broadcasting Headend 12 and a plurality of end-user rendering devices 14 (only one shown for the sake of clarity).

The Headend 12 prepares media content for transmission to the end-user rendering devices 14 for rendering to viewers 16 (only one shown for the sake of clarity) via output devices 18 (only one shown for the sake of clarity).

At least some of the received content may be stored in the end-user rendering devices 14 for rendering at a later time. The stored content may be spliced with other content or selected for rendering by itself, for example, but not limited to, for use in replacing advertisements for targeted advertising systems.

The Headend 12 is operative to determine one or more splice points at which to begin rendering the stored content for output to the output devices 18. In accordance with an alternative embodiment of the present invention, the Headend 12 determines one or more splice points at which to begin rendering "Live" content or almost live content for output to the output devices 18. The Headend 12 is also operative to prepare the splice point(s) for transmission to the end-user rendering devices 14. The preparation of splice points is described in more detail with reference to FIGS. 2-5.

The Headend 12 typically includes, among other components, a plurality of operationally connected modules including an encoder 20, a signal generator 22 and a multiplexer 24. The output of the encoder 20 is operationally connected to the input of the signal generator 22. The output of the signal generator 22 is operationally connected to the input of the multiplexer 24. The Headend 12 is described in more detail with reference to FIGS. 2-5.

FIG. 1 shows that a broadcast stream 26 is broadcast from the Headend 12 to the end-user rendering devices 14 via satellite communication. However, it will be appreciate by those ordinarily skilled in the art that the broadcast stream 26 may be transmitted via any suitable communication system, for example, but not limited to, satellite, cable, terrestrial, Internet Protocol, and cellular telephone network or any suitable combination thereof.

The end-user rendering devices 14 may include any suitable device for storing and rendering content, for example, but not limited to, a set-top box or a receiver-decoder device, a personal video recorder, a digital video recorder, a suitably configured television, a suitably configured computer system or mobile device such as a mobile telephone, television or PDA. It should be noted that the end user rendering devices 14 may be implemented in a home network or as a stand-alone device. Additionally, it should be noted that the end user rendering device 14 may be implemented as a separate storage device and a separate rendering device, for example, but not limited to, a set-top box in a home network whereby the set-top box renders content stored in a peripheral device in the home network.

The end-user rendering devices 14 are described in more detail with reference to FIGS. 6-13.

The output devices 18 may include any suitable device for outputting audio and video content, such as a television, a screen and projector arrangement, a suitably configured personal computer system, or a mobile device including a mobile telephone or PDA.

Figure 2:
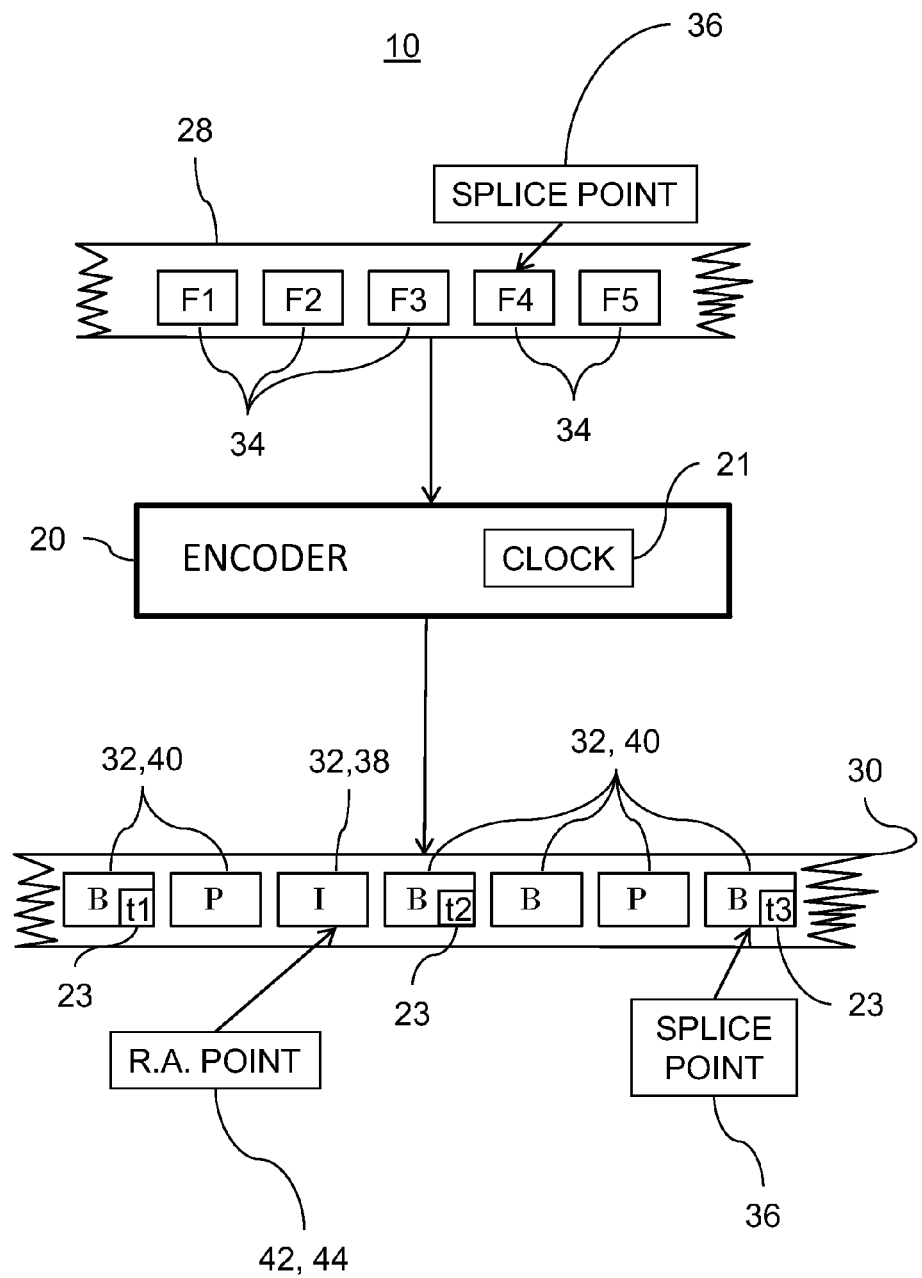
FIG. 2 is a partly pictorial, partly block diagram view showing encoding of a video sequence in the system of FIG. 1.

Reference is now made to FIG. 2, which is a partly pictorial, partly block diagram view showing encoding of a video sequence 28 in the system 10 of FIG. 1.

The encoder 20 is typically operative to receive the video sequence 28, typically in analogue or digital form. The video sequence 28 typically includes a plurality of video frames 34. In the end-user rendering devices 14 (FIG. 1), the time when the video frames 34 should be presented to the output device 18 (FIG. 1) for display is typically controlled using presentation time stamps (PTSs) (not shown) of the video frames 34. If the video sequence 28 does not have PTSs, the PTSs are typically added by the encoder 20. A splice point 36 in the presentation domain is typically expressed as one of the PTSs, by way of example only, and typically determines the point from which to start rendering the video sequence 28 (FIG. 2) by the end-user rendering device 14 (FIG. 1) for output to the output device 18 (FIG. 1). The splice point may be expressed as an SMPTE 312 timecode. In such a case, the SMPTE 312 timecode will typically need to be converted by the signal generator 22 to a suitable PTS value.

The encoder 20 is typically a video codec operative to encode the video sequence 28 yielding an encoded video sequence 30.

The encoded video sequence 30 typically includes a plurality of video packets 32. The encoder 20 includes a clock 21. The encoder 20 typically creates a plurality of timestamps 23, for example, but not limited to, program clock references (PCRs), during the encoding process based on the reading of the clock 21. The timestamps 23 are typically used to determine the "current time" in the end-user rendering devices 14 (FIG. 1) and generally are used to determine when the video packets 32 are presented to a decoder in the end-user rendering devices 14 for decoding, by way of example only. The PCRs assigned by the encoder may be updated (re-stamped) by the multiplexer 24 (FIG. 1) described in more detail with reference to FIG. 4.

PTSs are typically generated by the encoder 20 for inclusion in the appropriate video packets 32 of the encoded video sequence 30 so that when the video packets 32 are decoded by the end-user rendering devices 14, the PTSs are still available for deciding when to present the video frames 34 for display.

It will be appreciated that PTSs and PCRs are described by way of example only and that any suitable timecode or timestamp may be used.

By way of introduction, encoded video, for example, but not limited to, MPEG encoded video, includes frames which are independently encoded 38 and frames which are dependently encoded 40. Independently encoded frames 38, for example, but not limited to I-frames, do not require the decoding of other frames in order to render for output the picture encoded by the independently encoded frame 38. However, dependently encoded frames 40, for example, P-frames and B-frames, require one or more other frames to be decoded prior to being able to decode the desired dependently encoded frame 40. Therefore, if the splice point 36 is at a dependently encoded frame 40, the encoded video sequence 30 needs to be decoded from the previous independently encoded frame 38, otherwise known as a random-access point 42 in the encoded video sequence 30. Therefore, the random-access-point 42 is a point from which to start decoding the encoded video sequence 30 by the end-user rendering device 14 (FIG. 1) so that the video sequence 28 may be rendered for output from the splice point 36.

As the encoded video sequence 30 is generally stored and accessed from storage using the video packets 32 (and not in the form of the video frames 34), the random-access point 42 is generally defined in terms of a random-access-point packet 44 of the video packets 32. It should be noted that each of the encoded frames 38, 40 may be encoded as one or more of the video packets 32. So for example, an I-frame 38 may be encoded as several video packets 32. The random-access-point packet 44 is chosen such that the random-access-point packet 44 is the first packet which includes data of the frame of the random-access point 42. For the sake of clarity only one video packet 32 has been shown in the figures for each of the encoded frames 38, 40.

It should be noted that the random-access point 42 is typically the latest of the random-access-points from which to start decoding the encoded video sequence 30 by the end-user rendering device 14 (FIG. 1) so that the video sequence 28 may be rendered for output from the splice point 36. It will be appreciated that the random access point 42 may also be prior to the latest random-access-point, but it would generally be more efficient to choose the latest random-access point 42.

So in summary, in addition to needing to know the location of the splice point 36 for deciding where to start displaying the video sequence 28, the end-user rendering devices 14 need to know the location of the random-access-point 42 in the encoded video sequence 30 from which point decoding needs to commence.

Figure 3:
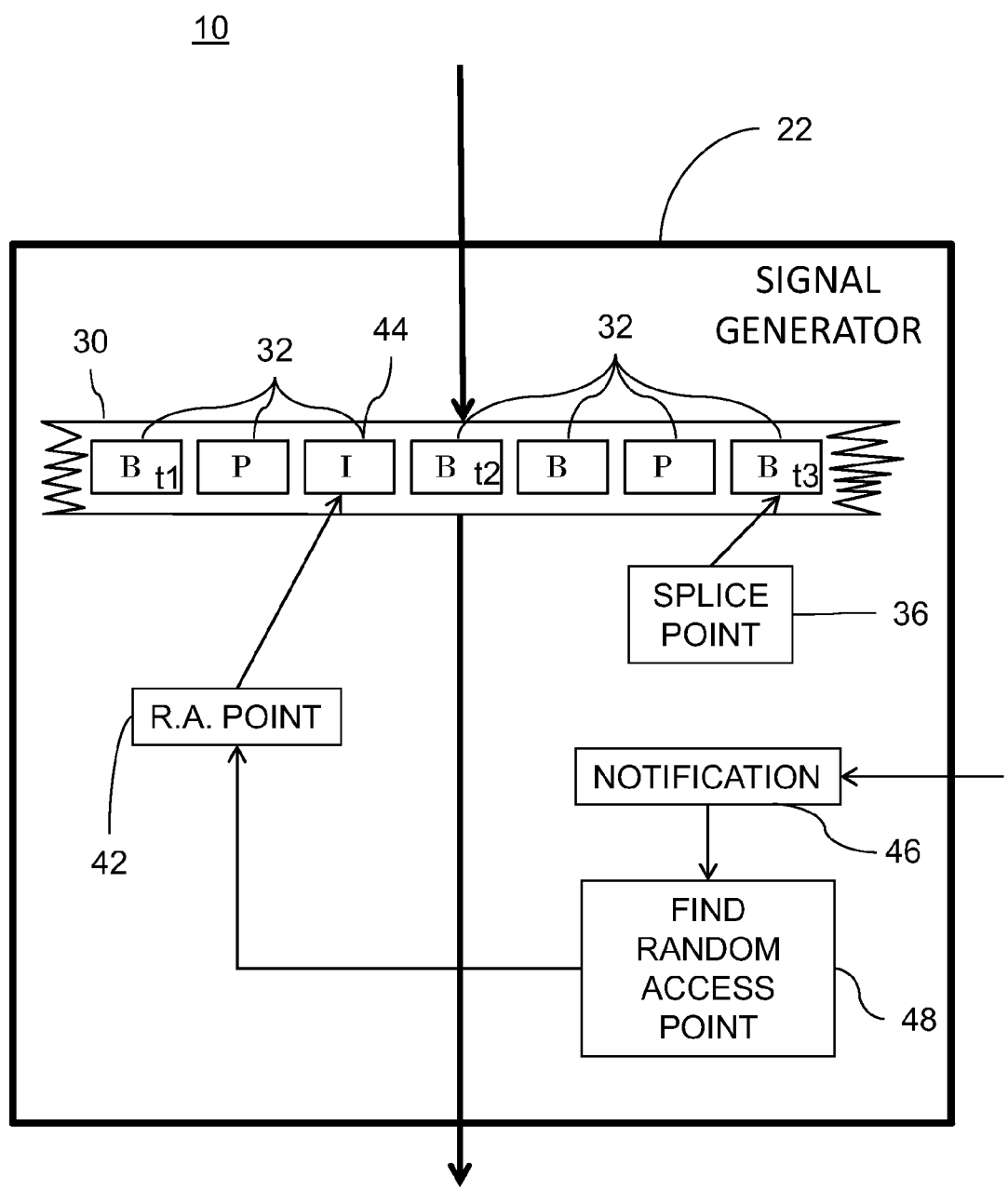
FIG. 3 is a partly pictorial, partly block diagram view showing finding a random access point in the system of FIG. 1.

Reference is now made to FIG. 3, which is a partly pictorial, partly block diagram view showing finding the random access point 42 in the system 10 of FIG. 1.

The signal generator 22 is operative to receive the encoded video sequence 30 from the encoder 20 (FIG. 2). The signal generator 22 is typically operative to receive a notification 46 of the location of the splice point 36, and in particular in which of the video packets 32 the splice point 36 in located in. The notification 46 may be any suitable signal received from an external source signaling the splice point 36.

It will be appreciated by those ordinarily skilled in the art that the output of the encoder 20 may be directly connected to the input of the multiplexer 24 (FIG. 1). In such a case, the signal generator 22 is operative to monitor the encoded video sequence 30 as the encoded video sequence 30 is being sent from the encoder 20 to the multiplexer 24 (FIG. 1).

It will be appreciated by those ordinarily skilled in the art that the signal generator 22 may be implemented within the encoder 20.

In an MPEG system, the signal generator 22 is typically operative to receive the notification 46 of the splice point 36 in the encoded video sequence 30 based on a presentation time-stamp (PTS) or STMPE 312 timecode of the splice point 36.

The signal generator 22 is operative to analyze at least some of the encoded video packets 32 based on the notification 46 of the splice point 36 in order to find the random-access-point-packet 44 (block 48). In MPEG, the random-access-point packet 44 is typically determined by the frame type included in the picture header of each frame 38. In MPEG-4, each random-access-point packet 44 is identified by a random-access-indicator (RAI).

Figure 4:
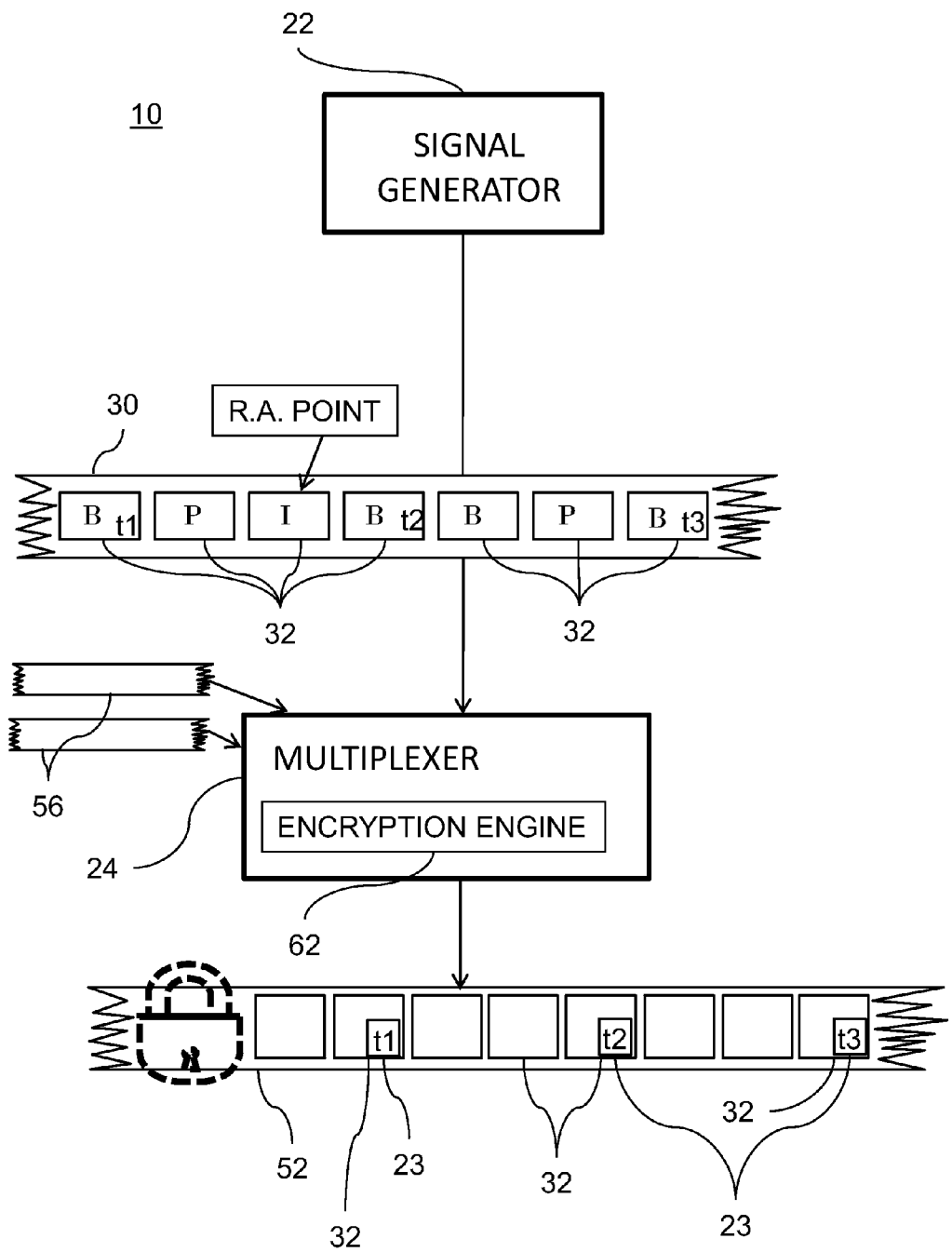
FIG. 4 is a partly pictorial, partly block diagram view showing multiplexing of video packets in the system of FIG. 1.

Reference is now made to FIG. 4, which is a partly pictorial, partly block diagram view showing multiplexing of the video packets 32 in the system 10 of FIG. 1.

The multiplexer 24 is operative to: receive the encoded video packets 32 of the encoded video sequence 30 from the signal generator 22; and prepare a transport stream 52 including the video packets 32 and the timestamps 23. As described above with reference to FIG. 2, the timestamps 23, created by the encoder 20 (FIG. 2), are typically PCRs, by way of example only, and the timestamps 23 may be updated (re-stamped) by the multiplexer 24. The re-stamped timestamps 23 are typically based on preserving the temporal distance between original timestamps 23. The multiplexer 24 is typically operative to multiplex the video packets 32 of the encoded video sequence 30 with other video packets of one or more video sequences 56. The timestamps 23 may be included in the video packets of the transport stream 52 or in the audio packets or metadata packets. It should be noted that if the PCRs are re-stamped by the multiplexer 24 so are the PTSs.

The multiplexer 24 typically includes an encryption engine 62 operative to encrypt the payload of the video packets 32 using any suitable encryption method. At least part of the header of each of the video packets 32 is typically left unencrypted (in the clear). The encryption engine 62 may utilize an encryption key which is changed periodically every crypto-period. It will be appreciated by those ordinarily skilled in the art that payload of the video packets 32 may be sent in the clear or partially encrypted with some packets 32 encrypted and other packets in the clear.

Figure 5:
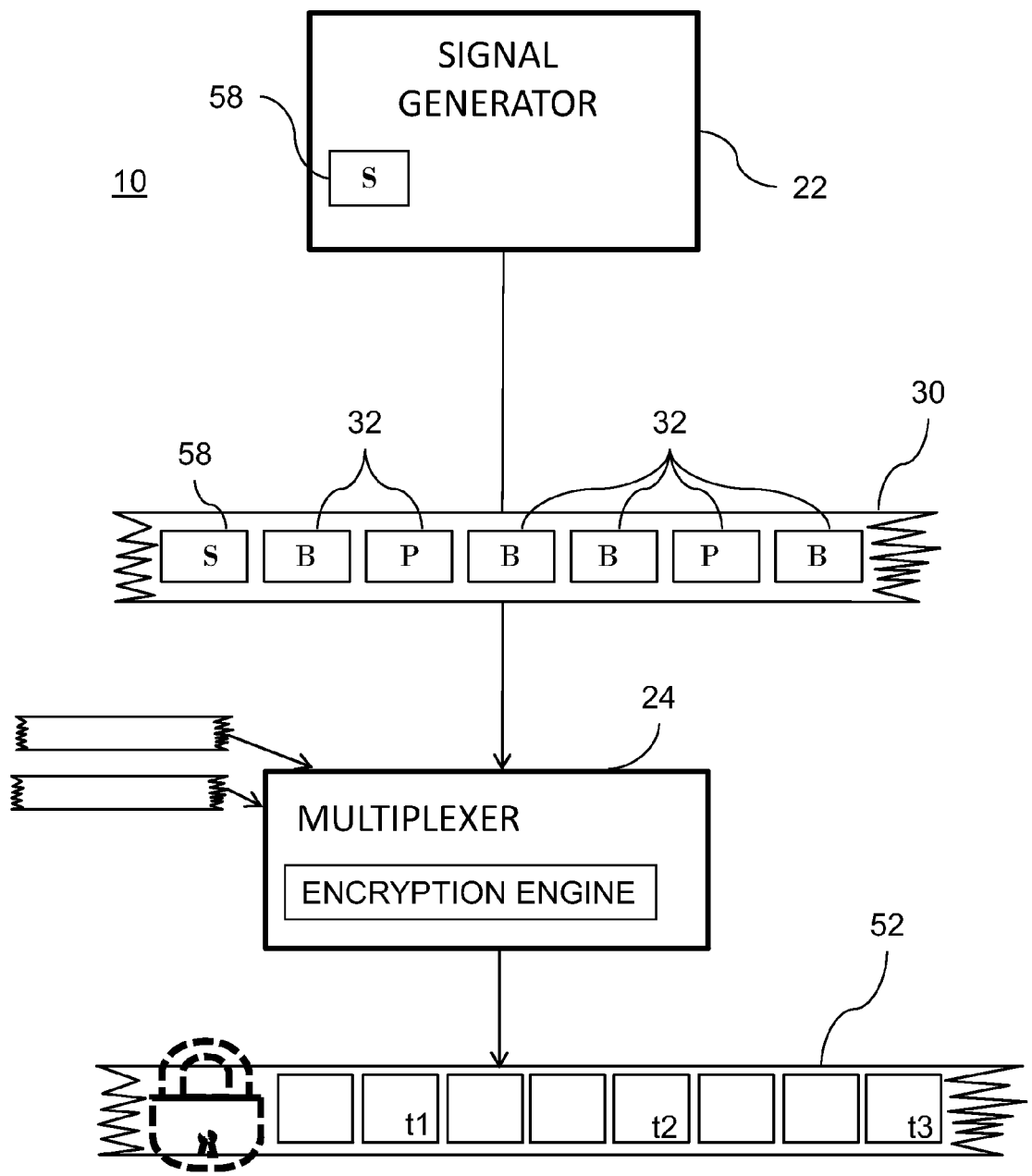
FIG. 5 is a partly pictorial, partly block diagram view showing creation of a timing signal in the system of FIG. 1.

Reference is now made to FIG. 5, which is a partly pictorial, partly block diagram view showing creation of a timing signal 58 in the system 10 of FIG. 1.

The signal generator 22 is typically operative to create the timing signal 58 which estimates the location of the random-access-point packet 44 (FIG. 3) in the encoded video sequence 30. The timing signal 58 may estimate the location of the random-access-point packet 44 (FIG. 3) or even identify the random-access-point packet 44 exactly.

When the random-access-point packet 44 (FIG. 3) is identified with a random-access-indicator (RAI) by the encoder 20 (FIG. 2) as part of the MPEG video encoding, by way of example only, the estimated timing signal 58 can actually be used to determine the random-access-point packet 44 at the end-user rendering device 14 (FIG. 1) exactly, as will be described in more detail with reference to FIGS. 11 and 12.

In MPEG for example, the timing signal 58 typically estimates the PCR included in the random-access-point-packet 44 (FIG. 3). However, it should be noted that a PCR may not be assigned to every packet 32 and may not be assigned to the random-access-point-packet 44. Generally, a PCR is only assigned to the random-access-point-packet as a matter of MPEG procedure if the RAI is flagged. It should be noted that in MPEG-4 use of the RAI is mandatory and therefore assigning the PCR to the random-access-point-packet 44 is mandatory. Since a PCR may not be assigned to every packet 32, in certain cases the timing signal 58 only estimates what the PCR of the random-access-point-packet 44 would have been if the random-access-point-packet 44 would have a PCR assigned by the encoder 20 (FIG. 2). Therefore, at the end-user rendering unit 14 (FIG. 1), the random-access-point-packet 44 may be identified using estimation techniques based on the timing signal 58, described in more detail with reference to FIGS. 7-12.

The signal generator 22 is typically operative to output the timing signal 58 to the multiplexer 24.

It will be appreciated by those ordinarily skilled in the art that the timing signal 58 may be sent in any suitable manner, for example, but not limited to, in an MPEG-2 private data section or any suitable metadata stream.

It will be appreciated by those ordinarily skilled in the art that the timing signal 58 may be outputted for transmission to the end-user rendering devices 14 via any suitable transmission equipment without first passing through the multiplexer 24.

If the timing signal 58 is used by the end-user rendering devices 14 without first decrypting the encrypted parts of the video packets 32 then it would be more convenient for the timing signal 58 to be left unencrypted (in the clear) or separately encrypted from the video packets 32.

The timing signal 58 is typically based on the original timestamps 23 (or other suitable timecode) created by the encoder 20 (FIG. 2). Basing the timing signal 58 on the original timestamps 23 created by the encoder 20 is particularly useful when the multiplexer 24 does not re-stamp the timestamps 23 created by the encoder 20. The timing signal 58 estimating the random-access-point packet 44 (FIG. 3) is typically created based on the original timestamps 23 adjacent to, or close to, the random-access-point packet 44. Additionally, when the multiplexer 24 does not re-stamp the timestamps 23 and the random-access-point packet 44 includes an RAI and the timestamps 23 are included in the video stream, then the timing signal 58 typically identifies the exact timestamp 23 of the random-access-point packet 44.

The timing signal 58 may included in any suitable packet, for example, but not limited to, in a private descriptor of a DVB Synchronized Auxiliary Data (SAD) packet.

In accordance with an alternative embodiment of the present invention, the timing signal 58 estimating the location of the random-access-point packet 44 is based on the original (not re-stamped) timestamps 23 created by the encoder 20 (FIG. 2) even when the original timestamps are subsequently re-stamped by the multiplexer 24. Therefore, in order to overcome the timing discrepancy caused by the re-stamping of the multiplexer 24, a suitable packet, for example, but not limited to, a DVB Synchronized Auxiliary Data (SAD) packet, is used to transmit the timing signal 58, as follows. The SAD packet is assigned a PTS by the encoder 20 (FIG. 2). The SAD packet also includes a private descriptor. The private descriptor is set by the signal generator 22 to be equal to a value X, which is the difference between the original PTS of the SAD packet (assigned by the encoder 20) and the timing signal 58 which is based on the original (not re-stamped) timestamps 23. The value X of the SAD packet is not re-stamped by the multiplexer 24. The PTS of the SAD packet may be re-stamped by the multiplexer 24. However, even if the PTS of the SAD packet is re-stamped by the multiplexer 24, the PCR of the random-access-point packet 44 will also be re-stamped. The difference between a PCR and PTS where the PTS is temporally positioned in unchanged by re-stamping of the multiplexer 24. At the end-user rendering devices 14 (FIG. 1) the timing signal 58 adjusted for the re-stamping by the multiplexer 24 (which is the estimated PCR of the random-access-point packet 44) is given by the private descriptor X plus the re-stamped PTS field. It will be appreciated by those ordinarily skilled in the art that a SAD packet is described by way of example only, and that any suitable packet may be used where the private descriptor is not re-stamped by the multiplexer 24. Therefore, the signal generator 22 is typically operative to: create/update a data packet (e.g. a SAD packet) having a private descriptor and a timestamp (typically a PTS) such that the private descriptor includes a value X equal to the difference between the timestamp (e.g. the PTS) of the data packet and the timing signal 58; and output the data packet including the value X to the multiplexer 24 or a transmission equipment.

In accordance with an alternative embodiment of the present invention, the timing signal 58 is determined for the splice point 36 in "Live" content. Typically, the encoded video sequence 30 needs to be buffered in the signal generator 22 to ensure that the timing signal 58 is placed ahead of the random-access-point packet 44 (FIG. 3) in the encoded video sequence 30 so that when the encoded video sequence 30 arrives at the end-user rendering devices 14 the timing signal 58 is received before the random-access-point packet 44 and with enough notice to allow the end-user rendering devices 14 to prepare for the splicing process. Alternatively, the transport stream 52 may be buffered in the multiplexer 24, and the multiplexer suitably places the timing signal 58 in the transport stream 52 ahead of the random-access-point packet 44. Alternatively, the encoded video sequence 30 may be buffered in the end-user rendering devices 14 to allow for the possible arrival of the timing signal 58.

Figure 6:
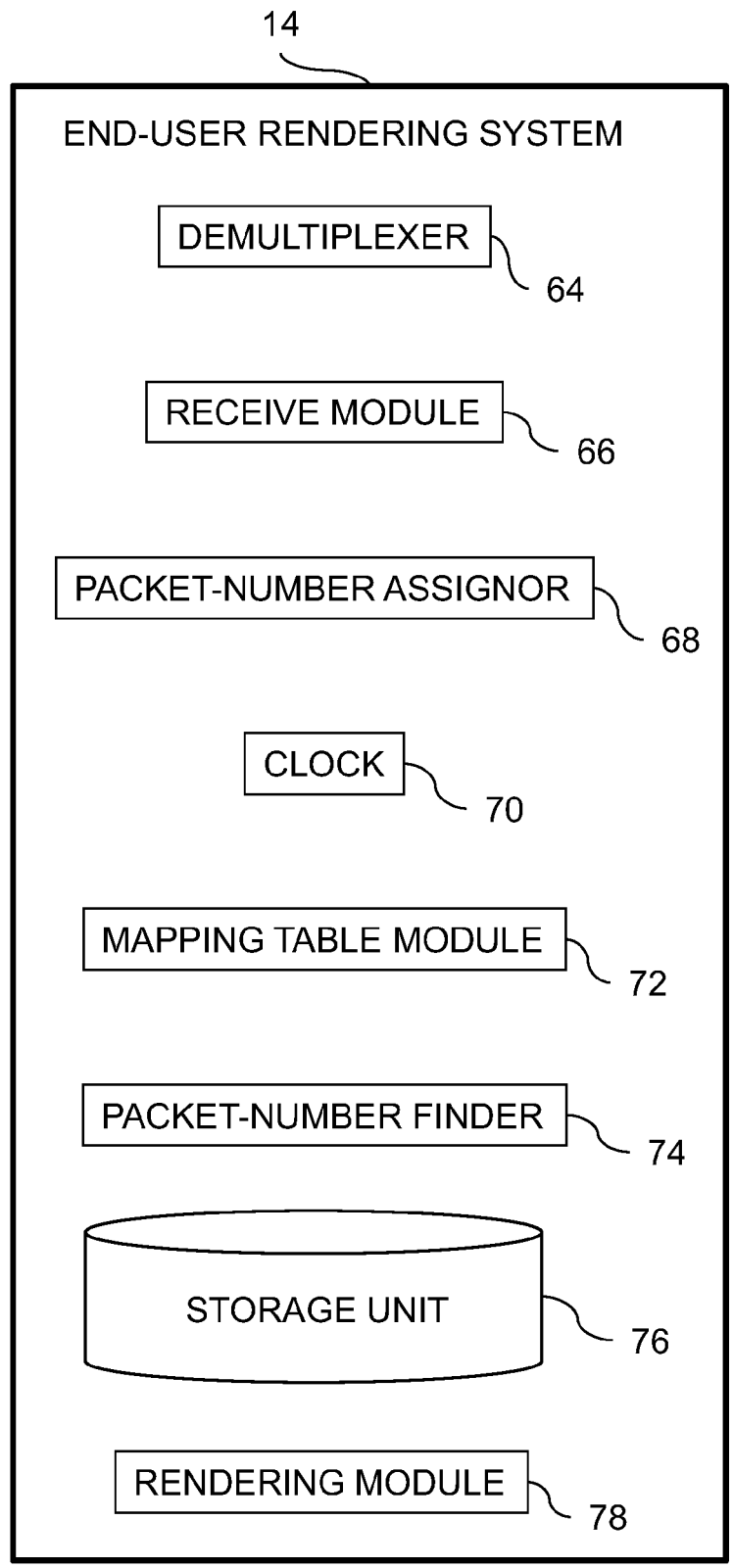
FIG. 6 is a block diagram view of an end-user rendering device in the system of FIG. 1.

Reference is now made to FIG. 6, which is a block diagram view of the end-user rendering devices 14 in the system 10 of FIG. 1.

Each of the end-user rendering devices 14 typically includes a plurality of operationally connected modules including a demultiplexer 64, a receive module 66, a packet-number assignor 68, a clock 70, a mapping table module 72, a packet-number finder 74, a storage unit 76 and a rendering module 78. The modules of the end-user rendering devices 14 are described in more detail with reference to FIGS. 7-13.

Figure 7:
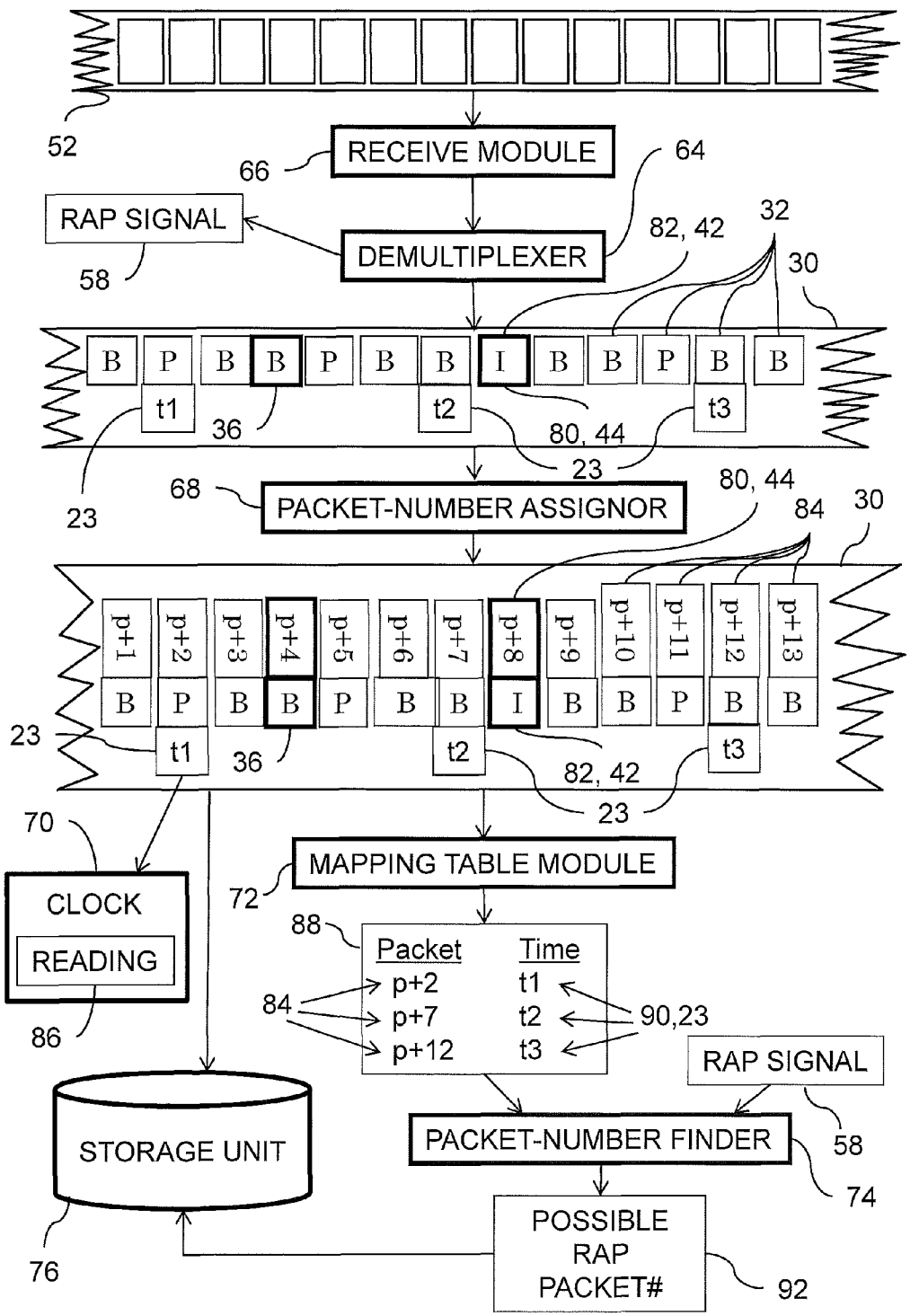
FIG. 7 is a partly pictorial, partly block diagram view showing processing of a received transport stream in the end-user rendering device of FIG. 6.

Reference is now made to FIG. 7, which is a partly pictorial, partly block diagram view showing processing of the transport stream 52 received by the end-user rendering device 14 of FIG. 6.

The receive module 66 is typically operative to receive a media stream or transport stream 52 from the Headend 12 (FIG. 1). The transport stream 52 includes the encoded video sequence 30 having the video packets 32 (only some of the packets 32 are labeled for the sake of clarity). The video packets 32 include a plurality of random-access-point-packets 80 (including the random-access-point packet 44) representing random-access-points 82 (including the random-access point 42) in the encoded video sequence 30. The transport stream 52 also includes the timestamps 23 created by the encoder 20, and possibly re-stamped by the multiplexer 24 (FIG. 5). FIG. 7 shows that the timestamps 23 are included in some of the video packets 32 of the encoded video sequence 30. In accordance with another embodiment of the present invention, the timestamps 23 are included in the audio stream. In accordance with yet another embodiment of the present invention, the timestamps 23 are included in the metadata stream or any other suitable stream. The receive module 66 is typically operative to receive the encoded video sequence 30 at least partially cryptographically encrypted, for example, the payload of the packets 32 may be encrypted and at least part of the header of each of the packets 32 may be in the clear. However, it will be appreciated by those ordinarily skilled in the art that the encoded video sequence 30 may be received in the clear or partially encrypted in any suitable form.

The receive module 66 is operative to receive the timing signal 58 from the Headend 12 (FIG. 1). The timing signal 58 estimates the location in the encoded video sequence 30 of the random-access-point-packet 44 representing the random-access point 42 in the encoded video sequence 30. As described above with reference to FIG. 2, the random-access point 42 is the point from which to start decoding the encoded video sequence 30 so that the video sequence 28 (FIG. 2) may be rendered for output to the output device 18 (FIG. 1) from the splice point 36.

The demultiplexer 64 is typically operative to demultiplex the transport stream 52 to select the encoded video sequence 30 and the timing signal 58 from the other data in the transport stream 52.

The packet-number assignor 68 is typically operative to sequentially assign a plurality of packet-numbers 84 (only some labeled for the sake of clarity) to the received video packets 32 of the encoded video sequence 30 so that each video packet 32 is assigned one packet number 84. The assigning of packet-numbers 84 generally enables easier random-access to the encoded video sequence 30 when the encoded video sequence 30 is stored in the storage unit 76, as access to the encoded video sequence 30 may then be made with reference to the packet-numbers 84.

The clock 70 is operative to provide a clock reading 86. The clock 70 is generally at least partially driven by at least some of the timestamps 23. The clock reading 86 may be used to control when video frames, audio frames and subtitles are presented for display according to PTSs in the video, audio and subtitles streams, respectively. The clock reading 86 is also used during rendering to know when the splice point 36 (FIG. 2) has been reached.

The mapping table module 72 is operative to maintain a mapping table 88 which maps at least some of the packet-numbers 84 to a plurality of timing values 90. The mapping is performed such that the timing value 90 mapped to a packet-number 84 of a particular packet 32 is assigned according to a certain time, typically the arrival time, of the particular packet 32.

Figure 9:
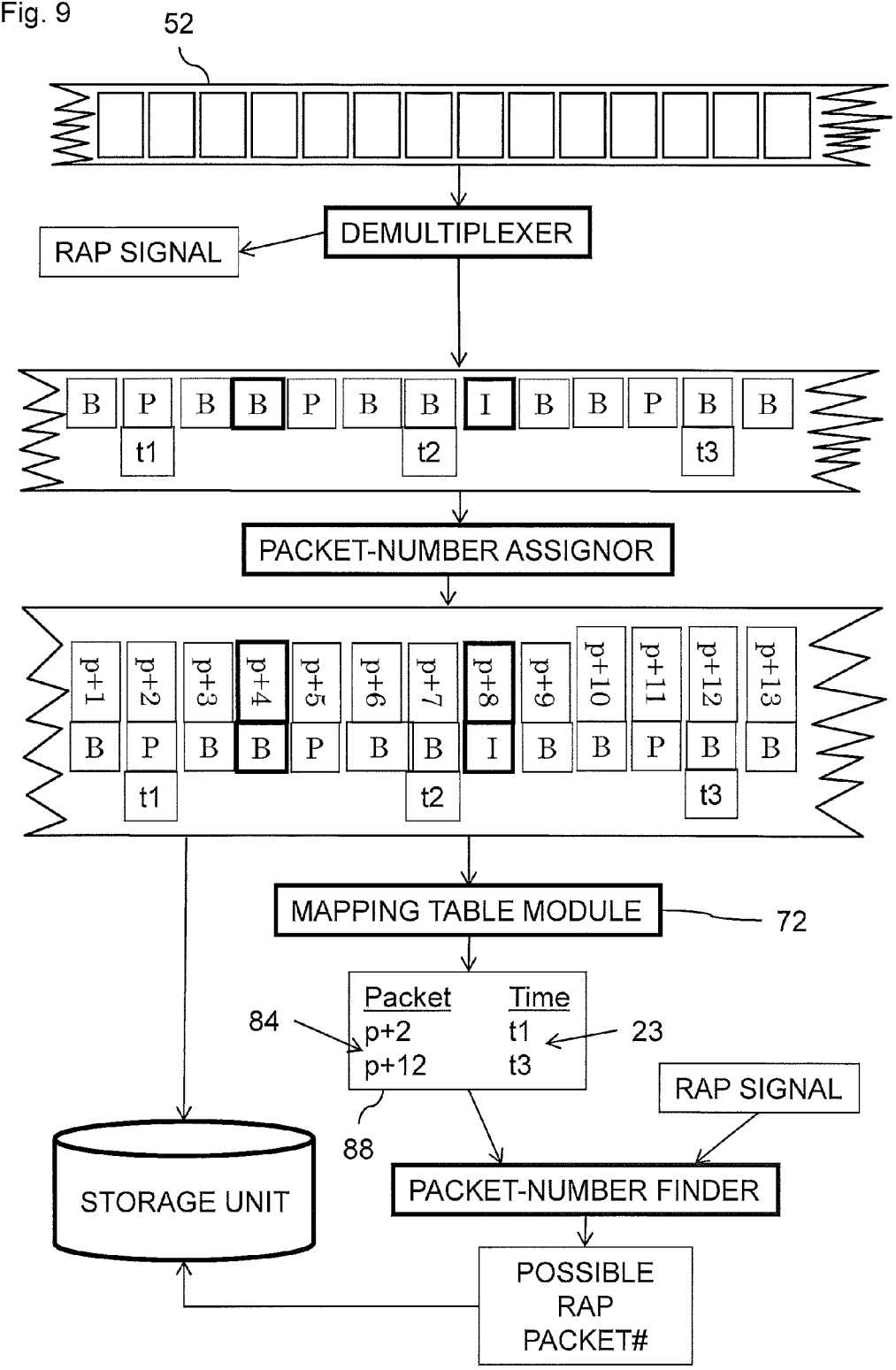
FIG. 9 is a partly pictorial, partly block diagram view showing a first alternative processing of a received transport stream in the end-user rendering device of FIG. 6.
Figure 10:
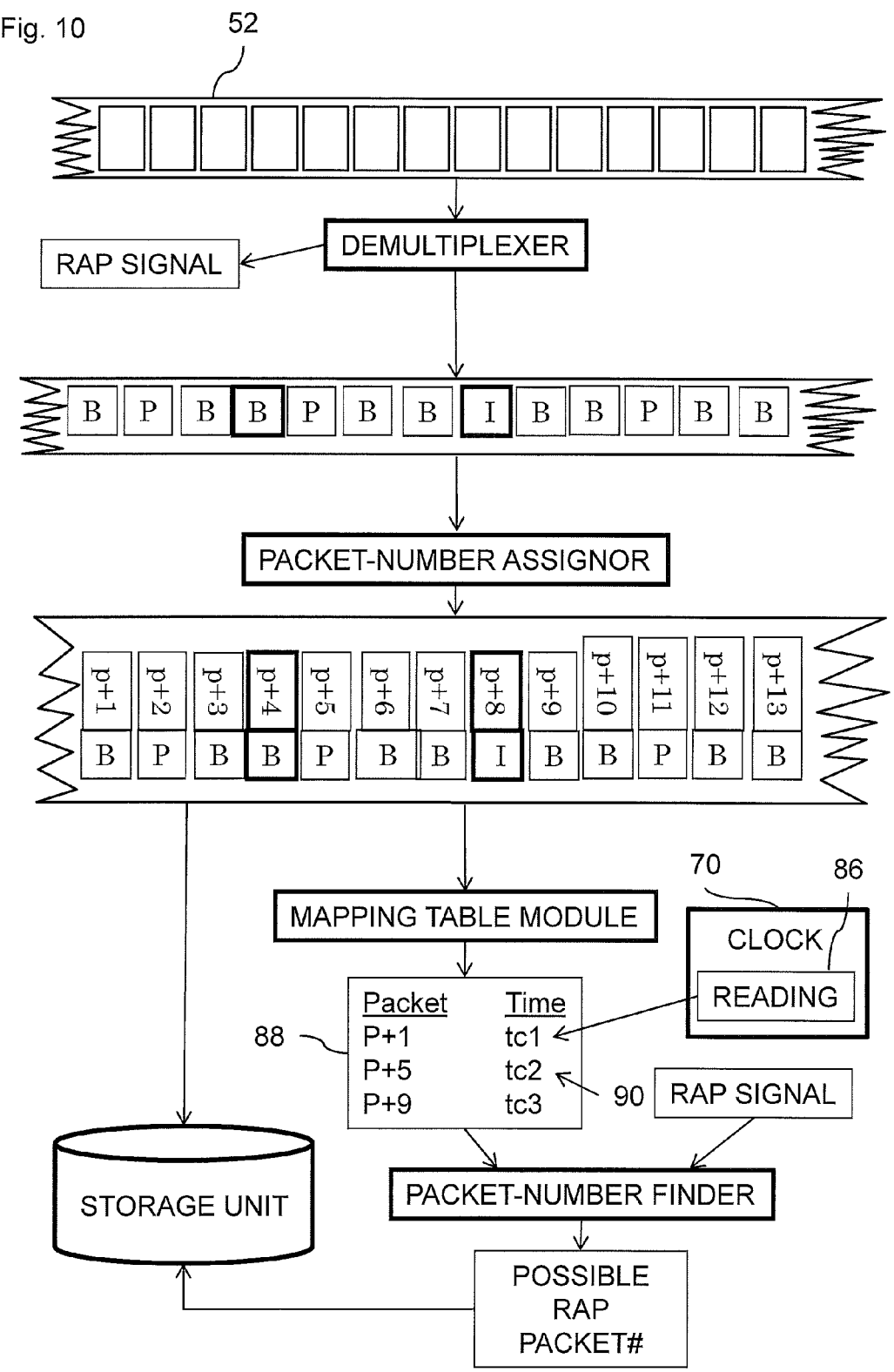
FIG. 10 is a partly pictorial, partly block diagram view showing a second alternative processing of a received transport stream in the end-user rendering device of FIG. 6.

As at least some of the arriving timestamps 23 are used to at least partially drive the clock 70, the arriving timestamps 23 can also be used as a measure of arrival time. Therefore, the arrival time used in the mapping table 88 may be based on: one of the timestamps 23 (for example, the timing value 90 of the particular packet 32 mapped to the packet number 84 is the timestamp 23 of the particular packet 32 as shown in FIGS. 7, 9 and 11); or the clock reading 86 (as shown in FIG. 10). When the mapping is based on the timestamps 23, the mapping may be performed for every timestamp 23 that arrives (as shown in FIG. 7) or the mapping may skip one or more timestamps 23 (as shown in FIG. 9).

In accordance with an alternative embodiment of the present invention, the timing signal 58 of the random-access point 42 is determined in terms of any suitable timecodes, for example, but not limited to, PTSs. In such a case, the mapping table 88 typically maps packet-numbers 84 against any suitable timecodes, for example, but not limited to, PTSs, such that the timing value 90 mapped to a packet-number 84 of a particular packet 32 is a certain timecode (for example, but not limited to, a PTS) of the particular packet 32.

FIG. 7 shows that the mapping table module 72 is operative to maintain the mapping table 88 to map the timestamps 23 of the video packets 32 to at least some packet-numbers 84. In other words, the timestamps 23 and corresponding packet numbers 84 of the packets 32 including the timestamps 23 are included in the mapping table 88 with the timestamps 23 mapped to the corresponding packet-numbers 84.

The packet-number finder 74 is typically operative to determine a possible packet-number 92 of the random-access-point packet 44 based on: the timing signal 58 estimating the location of the random-access point 42; and at least part of the data included in the mapping table 88. Determination of the possible packet-number 92 is described in more detail with reference to FIGS. 8 and 12.

The mapping table 88 is typically saved in volatile memory (not shown). However, it will be appreciated by those ordinarily skilled in the art that the mapping table 88 may be saved in any suitable memory. After the possible packet-number 92 has been found, some or all of the data of the mapping table 88 may be deleted. The deletion may take place as the encoded video sequence 30 is still being recorded or once the recording of the encoded video sequence 30 has completed. Alternatively, the mapping table 88 could be stored with the timing signal 58 and the possible packet-number 44 determined at playback time using the mapping table 88. It will be appreciated that determining the possible packet-number 44 at recording time saves long-term storage of the mapping table 88 and the timing signal 58 as well as saving additional processing at playback time.

The storage unit 76 is typically operative to store the encoded video sequence 30 therein. The encoded video sequence 30 is typically stored at least partially cryptographically encrypted, whereby the video packet payload is encrypted and at least part of the header of each packet 32 is kept in the clear. It will be appreciated by those ordinarily skilled in the art that the encoded video sequence 30 may be stored in a completely encrypted format or stored completely in the clear or any other suitable partially encrypted format.

The storage unit 76 is also typically operative to store therein an index file (not shown), the index filing including the possible packet-number 92 for later use.

Figure 8:
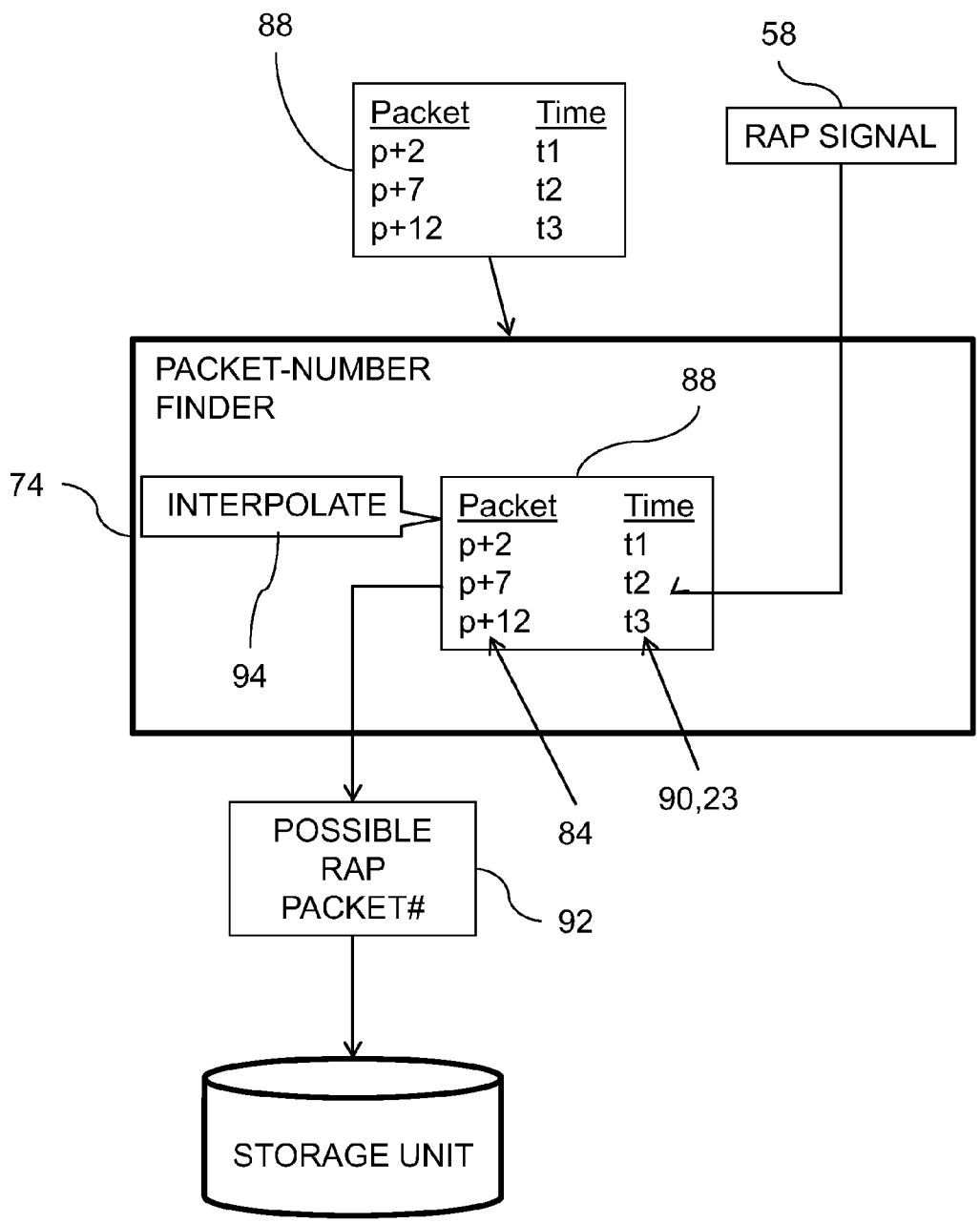
FIG. 8 is a partly pictorial, partly block diagram view showing determination of a possible packet-number of a random-access-point packet in the processing of FIG. 7.

Reference is now made to FIG. 8, which is a partly pictorial, partly block diagram view showing determination of the possible packet-number 92 of the random-access-point packet 44 (FIG. 7) in the processing of FIG. 7.

The following illustrates how the possible packet-number 92 may be determined from the timing signal 58 and the mapping table 88 using interpolation. In the example of FIG. 8, the timing values 90 are the timestamps 23.

The timing values 90 of the mapping table 88 include a timing value t2 and a timing value t3. The packet-numbers 84 of the mapping table 88 include a packet number p+7 and a packet number p+12. The timing values t2 and t3 map to packet numbers p+7 and p+12, respectively.

The packet-number finder 74 is preferably operative to determine the possible packet-number 92 of the random-access-point-packet 44 by a determination including interpolating (typically linearly) between the packet number p+7 and the packet number p+12 based on the timing signal 58, the timing value t2 and the timing value t3 (block 94).

Interpolation may be calculated as follows:

$$\text{``}p+7\text{''}+[(\text{``}p+12\text{''}-\text{``}p+7\text{''})\times(\text{``Timing Signal 58''}-t2)/(t3-t2)]$$

The result is then rounded to the nearest packet.

After the interpolation has been performed, determination of the possible packet number 92 generally includes "overestimation" as will now be described below.

Due to "Mux PCR jitter" as well as a not necessarily constant bit-rate of the encoder 20 (FIG. 2) (typically making linear interpolation a non-accurate method), it is necessary to over estimate the possible packet-number 92. For example, if the packet number determined by the interpolation is p+8, then the possible packet-number 92 may be overestimated to p+13, say, to allow for "Mux PCR jitter" and a non-constant bit-rate. The "overestimation" may typically be equal to the combined maximum possible "Mux PCR jitter" and bit-rate error.

In accordance with an alternative embodiment of the present invention, overestimation could be performed by over-estimation at the Headend 12 (FIG. 1) by over-estimating the timing signal 58 to allow for "Mux PCR jitter" and bit-rate issues.

It will be appreciated by those ordinarily skilled in the art that the possible packet-number 92 may be determined using similar estimation techniques including extrapolation from the packet numbers 84, by way of example only.

If the random-access-point-packets 80 (FIG. 7) include random-access indicators (RAIs), then the determination of the possible packet-number 92 is described with reference to FIG. 12.

Reference is now made to FIG. 9, which is a partly pictorial, partly block diagram view showing a first alternative processing of the received transport stream 52 in the end-user rendering device 14 of FIG. 6.

FIG. 9 shows that the mapping table 88 managed by the mapping table module 72 does not have a mapping for every received timestamp 23. The example of FIG. 9 shows that there is no mapping for timestamp t2. Therefore, in the example of FIG. 9 the interpolation of FIG. 8 is typically performed based on timestamps t1 and t3 and the corresponding packet numbers 84.

Reference is now made to FIG. 10, which is a partly pictorial, partly block diagram view showing a second alternative processing of the received transport stream 52 in the end-user rendering device 14 of FIG. 6.

FIG. 10 shows that the timing values 90 of the mapping table 88 are taken from the clock readings 86 of the clock 70. Assigning the timing values 90 based on the clock readings 86 is particularly useful when the timestamps 23 (FIG. 7) are not included in the encoded video sequence 30 but in another stream for example the audio or metadata stream.

Figure 11:
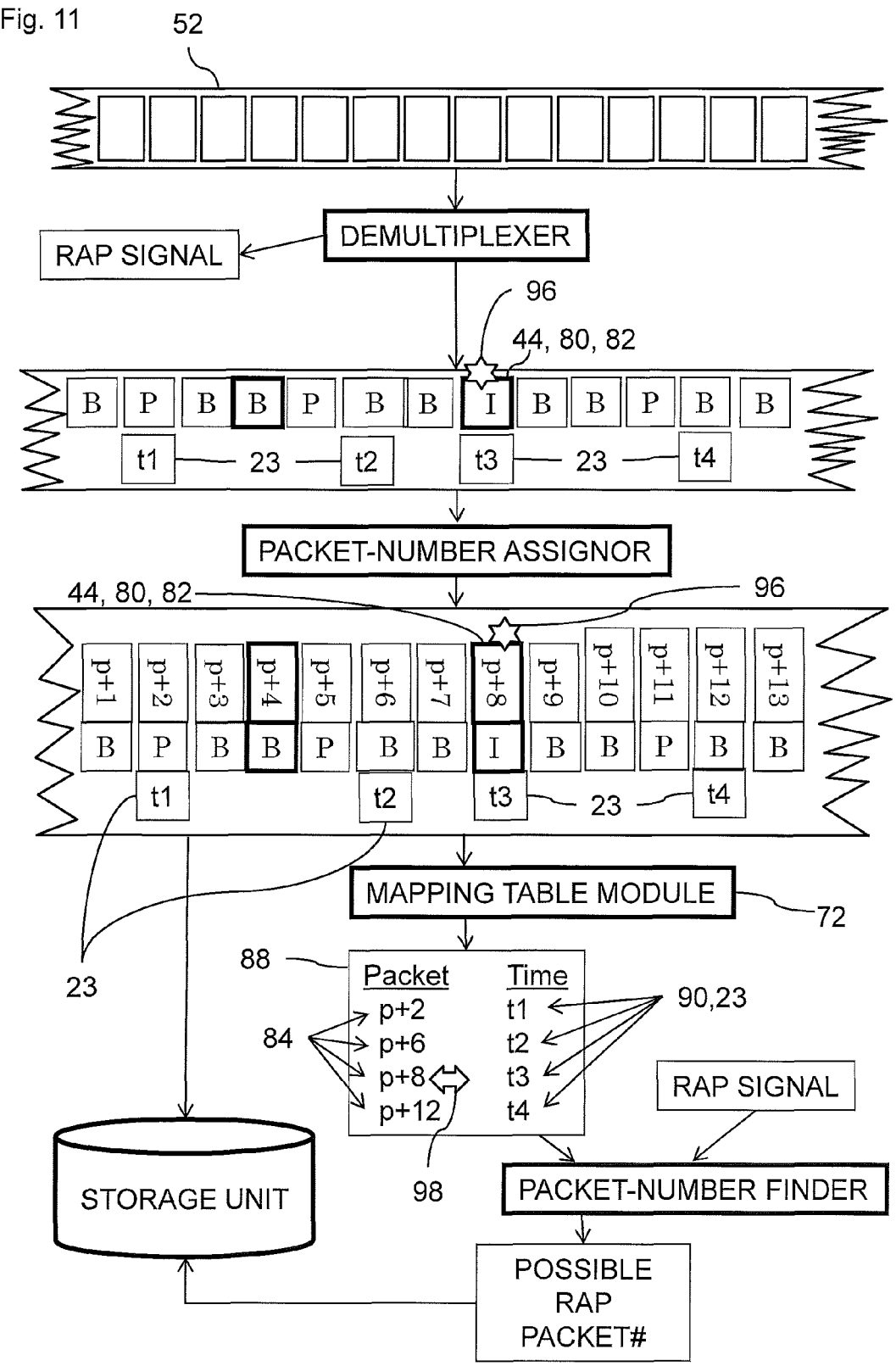
FIG. 11 is a partly pictorial, partly block diagram view showing a third alternative processing of a received transport stream in the end-user rendering device of FIG. 6.

Reference is now made to FIG. 11, which is a partly pictorial, partly block diagram view showing a third alternative processing of the received transport stream 52 in the end-user rendering device 14 of FIG. 6.

In accordance with an alternative embodiment of the present invention, each random-access-point-packet 80 (only one shown for the sake of simplicity) is identified by a random-access-indicator (RAI) 96. If the random-access-indicator 96 is used to identify the random-access-point-packets 80, and the timestamps 23 are included in the video stream (in the encoded video sequence 30), then the in accordance with the MPEG standard, each random-access-point-packet 80 includes one of the timestamps 23.

In addition to the mapping described above with reference to FIG. 7 or 9 or 10, the mapping table module 72 is typically operative to maintain in the mapping table 88 to map the packet-number 84 of each random-access-point-packet 80 (including the random-access-point packet 44) to one of the timing values 90 according to the arrival time of each random-access-point-packet 80, respectively, (for example, map the packet numbers 84 of the random-access-point-packets 80 to the time-stamps 23 (PCRs) of the packets 80). The mapping table module 72 is also typically operative to indicate (symbol 98) in the mapping table 88 that the random-access-point packets 80 are random-access-points 82.

Therefore, the mapping table 88 of FIG. 11 typically includes random-access-point-packet timing values 90 and random-access-point-packet packet numbers 84 and non-random-access-point-packet timing values 90 and non-random-access-point-packet packet numbers 84.

Figure 12:
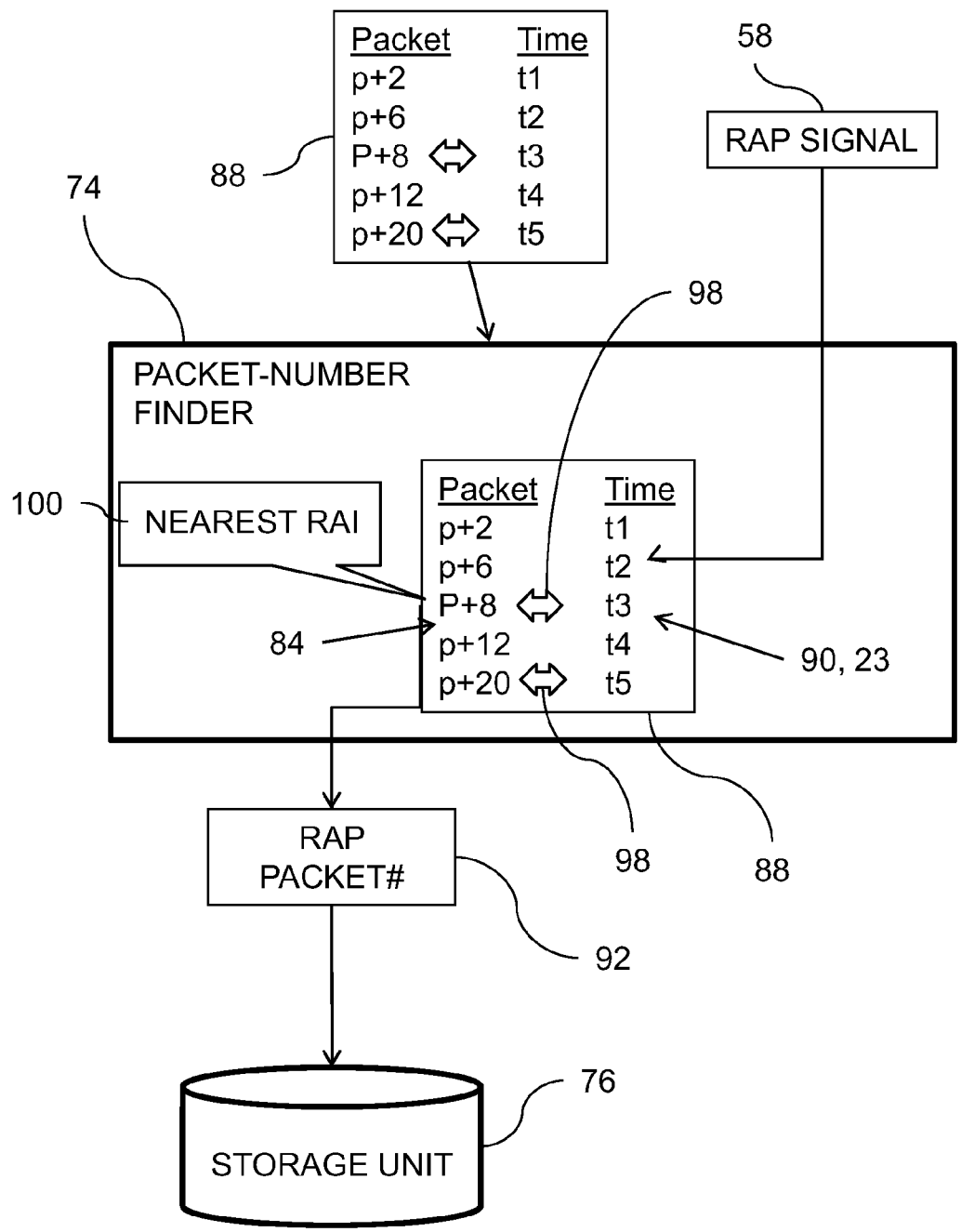
FIG. 12 is a partly pictorial, partly block diagram view showing determination of a possible packet-number of a random-access-point packet in the processing of FIG. 11.

Reference is now made to FIG. 12, which is a partly pictorial, partly block diagram view showing determination of the possible packet-number 92 in the processing of FIG. 11. Reference is also made to FIG. 11.

The timing signal 58 is generally the same as the actual timestamp 23 (e.g.: PCR) of the random-access-point-packet 44 when random-access-indicators 96 (FIG. 11) are used and the timestamps 23 are in the video steam. Finding the random-access-point-packet timing value 90 which is closest to the timing signal 58 will typically give the correct "possible" packet-number 92 of the random-access-point packet 44 (block 100). The random-access-point-packets 80 are indicated (symbol 98) in the mapping table 88 to allow the packet-number finder 74 to identify the data of the random-access-point-packets 80.

Therefore, the packet-number finder 74 is operative to find, in the mapping table 88, the random-access-point-packet timing value 90 which is closest to the timing signal 58, in order to find the correct "possible" packet-number 92 of the random-access-point-packet 44.

If the timestamps 23 (e.g.: PCRs) are not in the video stream, then although the random-access-point-packets 80 are flagged with the random-access-indicator 96, the timestamps 23 are not included in the random-access-point-packets 80. Even if the timestamps 23 are not in the video stream, the random-access-point-packets 80 flagged with the random-access-indicator 96 may be listed in the mapping table 88 and could be allocated a time based on the clock reading 86 (FIG. 10) as described with reference to FIG. 10. Therefore, the packet number 92 of the random-access-point packet 44 may be found by finding, in the mapping table 88, the random-access-point-packet timing value 90 which is closest to the timing signal 58.

In accordance with an alternative embodiment of the present invention, the packet numbers 84 of the random-access-point-packets 80 are listed in the mapping table 88 without being allocated timing values 90. In such a case, the possible packet-number 92 of the random-access-point-packet 44 can be estimated another way, for example, but not limited to, first using interpolation/extrapolation yielding an estimate packet number, as described above with reference to FIG. 8, and then the closest random-access-point-packet packet number 84 to the estimate packet number is typically chosen as the packet-number 92 of the random-access-point packet 44 for storage in the index table in the storage unit 76. Therefore, the mapping table module 72 is operative to maintain the mapping table 88 to: include the random-access-point-packet packet-numbers 84; and indicate (symbol 98) in the mapping table 88 that the random-access-point packets 80 are random-access-points 82. Additionally, the packet-number finder 74 is typically operative to determine the possible packet-number 92 of the random-access-point-packet 44 by a determination including: interpolating/extrapolating as described above with reference to FIG. 8 thereby yielding an estimate packet number; and finding, in the mapping table 88, the random-access-point-packet packet-number 84 which is closest to the estimate packet number yielding the possible packet-number 92. Finding the nearest random-access-point-packet packet number assumes that the combined "Mux PCR jitter" and bit-rate issues are less than half the distance between random-access-points 82 so that rounding to the nearest random-access-point-packet 80 will give the correct packet number 92.

The video packets 32 are typically at least partially encrypted throughout the processing described with reference to FIGS. 6-12 wherein the payload of the video packets 32 is typically encrypted and the header of the video packets 32 is typically at least partially in-the-clear (not encrypted). However, it will be appreciated by those ordinarily skilled in the art that the processes of FIGS. 6-12 may be performed if the video packets 32 are completely in the clear or remain completely encrypted throughout the processing (assuming that the timestamps 23 are not in the video stream) or any other suitable encrypted/non-encrypted combination.

Figure 13:
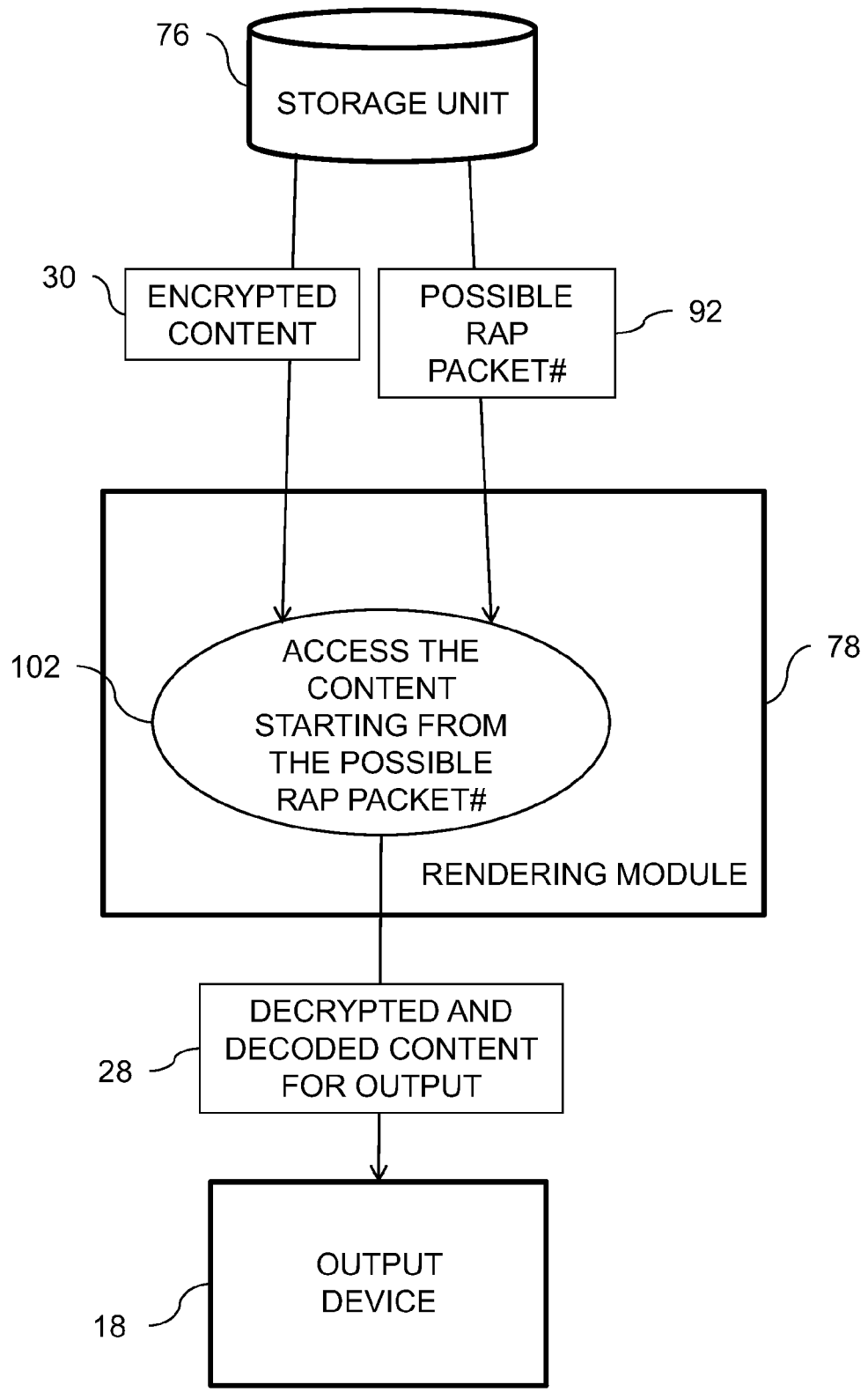
FIG. 13 is a partly pictorial, partly block diagram view showing rendering of content in the end-user rendering device of FIG. 6.

Reference is now made to FIG. 13, which is a partly pictorial, partly block diagram view showing rendering of content in the end-user rendering device 14 of FIG. 6.

The rendering module 78 is typically operative to: retrieve the possible packet-number 92 from the index file stored in the storage unit 76; and access the encoded video sequence 30 starting at the possible packet-number 92 (block 102). The rendering module 78 is generally operative to: decrypt the encoded video sequence 30, if encrypted, and decode the encoded video sequence 30 from the possible packet number 92 yielding at least part of the (non-encoded) video sequence 28. The rendering module 78 is typically operative to render the video sequence 28 for output to the output device 18 from the splice point 36 (FIG. 2). Rendering may be performed as part of content playback or trick-modes (or trick-play). Trick-modes typically include playback in fast and/or slow motion in forward and/or reverse directions.

It is appreciated that software components of the present invention may, if desired, be implemented in ROM (read only memory) form. The software components may, generally, be implemented in hardware, if desired, using conventional techniques. It is further appreciated that the software components may be instantiated, for example, as a computer program product; on a tangible medium; or as a signal interpretable by an appropriate computer.

It will be appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

It will be appreciated by persons skilled in the art that the present invention is not limited by what has been particularly shown and described hereinabove. Rather the scope of the invention is defined by the appended claims and equivalents thereof.

What is claimed is:

1. A Headend system comprising a plurality of operationally connected modules including:
 a video codec to encode a video sequence yielding an encoded video sequence having a plurality of video packets;
 a multiplexer to receive the video packets of the encoded video sequence and prepare a transport stream including the video packets; and
 a signal generator to:
  receive a notification of a splice point in the encoded video sequence, the splice point being a point from which to start rendering the video sequence by a rendering device for output to an output device;
  after the video sequence has been encoded, analyze at least some of the video packets of the encoded video sequence based on the notification of the splice point in order to find a random-access-point-packet of the packets, the random-access-point packet being a point from which to start decoding the encoded video sequence by the rendering device so that the video sequence may be rendered for output from the splice point;
  create a timing signal estimating a location of the random-access-point-packet in the encoded video sequence based on original timestamps created by the video codec; and
  output the timing signal to the multiplexer or a transmission equipment.

2. The system according to claim 1, wherein the signal generator is operative to receive the notification of the splice point in the video sequence based on a presentation timestamp of the splice point or a Society of Motion Picture and Television Engineers (SMPTE) 312 timecode of the splice point.

3. The system according to claim 1, wherein the multiplexer is operative to multiplex the video packets of the encoded video sequence with other video packets of at least one other video sequence.

4. The system according to claim 1, wherein the signal generator has an input and an output, the encoder having an output, the multiplexer having an input, the input of the signal generator being operationally connected to the output of the encoder, the output of the signal generator being operationally connected to the input of the multiplexer.

5. The system according to claim 1, wherein the signal generator is operative to:
 update or create a data packet having a private descriptor and a timestamp such that the private descriptor includes a value equal to the difference between the timestamp of the data packet and the timing signal; and
 output the data packet including the value to the multiplexer or a transmission equipment.

6. A method comprising:
 encoding a video sequence using a video codec yielding an encoded video sequence having a plurality of video packets;
 receiving a notification of a splice point in the encoded video sequence, the splice point being a point from which to start rendering the video sequence by a rendering device for output to an output device;
 after encoding the video sequence, analyzing at least some of the video packets of the encoded video sequence based on the notification of the splice point in order to find a random-access-point-packet of the packets, the random-access-point packet being a point from which to start decoding the encoded video sequence by the rendering device so that the video sequence may be rendered for output from the splice point;
 creating a timing signal estimating a location of the random-access-point-packet in the encoded video sequence based on original timestamps created by the video codec;
 outputting the timing signal to a multiplexer or a transmission equipment;
 receiving the video packets of the encoded video sequence by the multiplexer; and
 preparing a transport stream including the video packets by the multiplexer.

7. A Headend system comprising a plurality of operationally connected modules including:
 means for encoding a video sequence yielding an encoded video sequence having a plurality of video packets;
 means for receiving the video packets of the encoded video sequence;
 means for preparing a transport stream including the video packets;
 means for receiving a notification of a splice point in the encoded video sequence, the splice point being a point from which to start rendering the video sequence by a rendering device for output to an output device;
 means for analyzing at least some of the video packets of the encoded video sequence, after the video sequence has been encoded, based on the notification of the splice point in order to find a random-access-point-packet of the packets, the random-access-point packet being a point from which to start decoding the encoded video sequence by the rendering device so that the video sequence may be rendered for output from the splice point;
 means for creating a timing signal estimating a location of the random-access-point-packet in the encoded video sequence based on original timestamps created by the encoding means; and
 means for outputting the timing signal to one of: the means for receiving the video packets, the means for preparing, the means for receiving the notification, the means for analyzing, and transmission equipment.

* * * * *